April 28, 1942.  W. L. LOWMAN  2,281,102
REAR VISION DEVICE FOR VEHICLES
Filed June 24, 1940  2 Sheets-Sheet 2
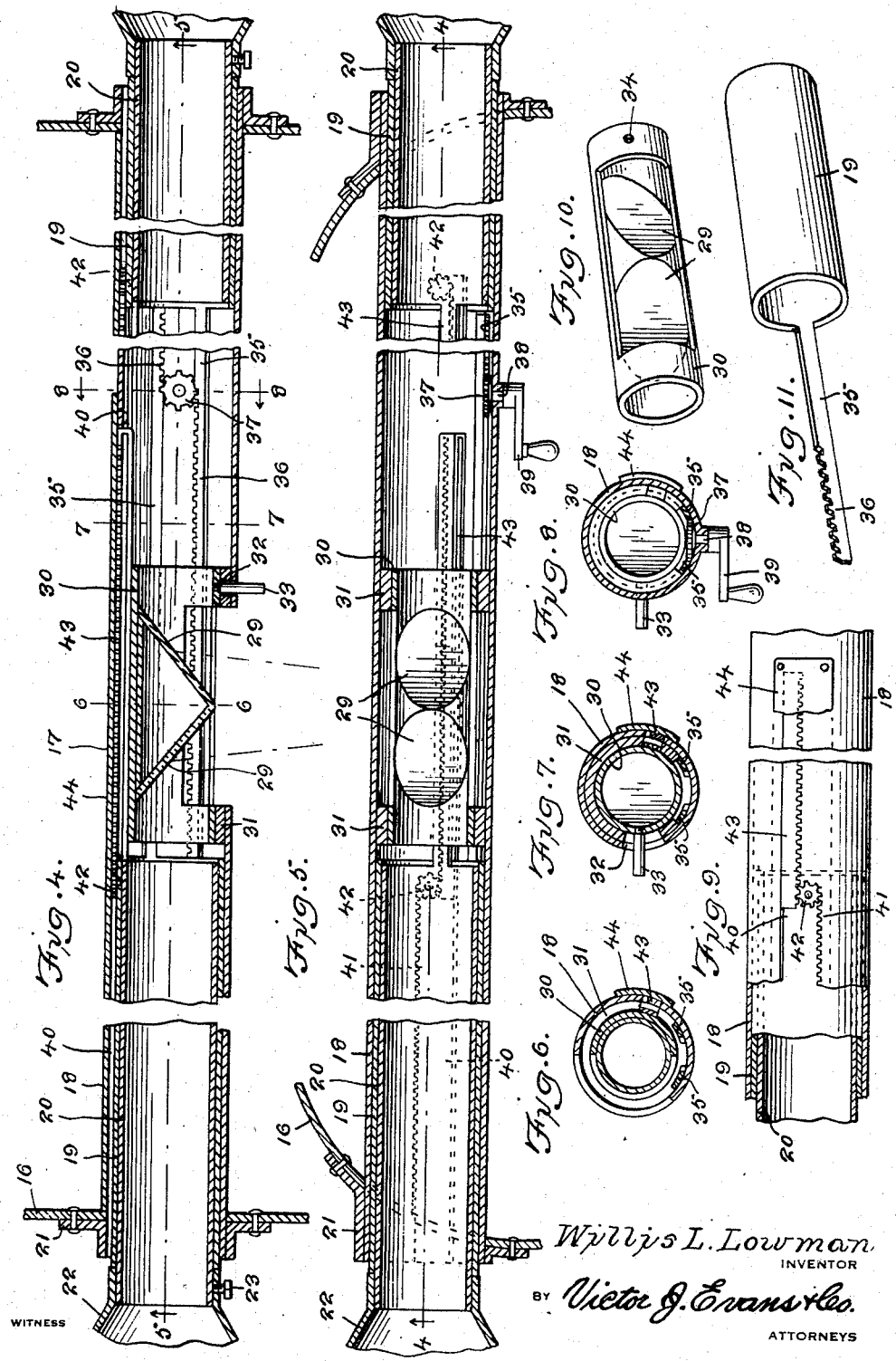
Willis L. Lowman
INVENTOR
BY Victor J. Evans & Co.
ATTORNEYS Patented Apr. 28, 1942

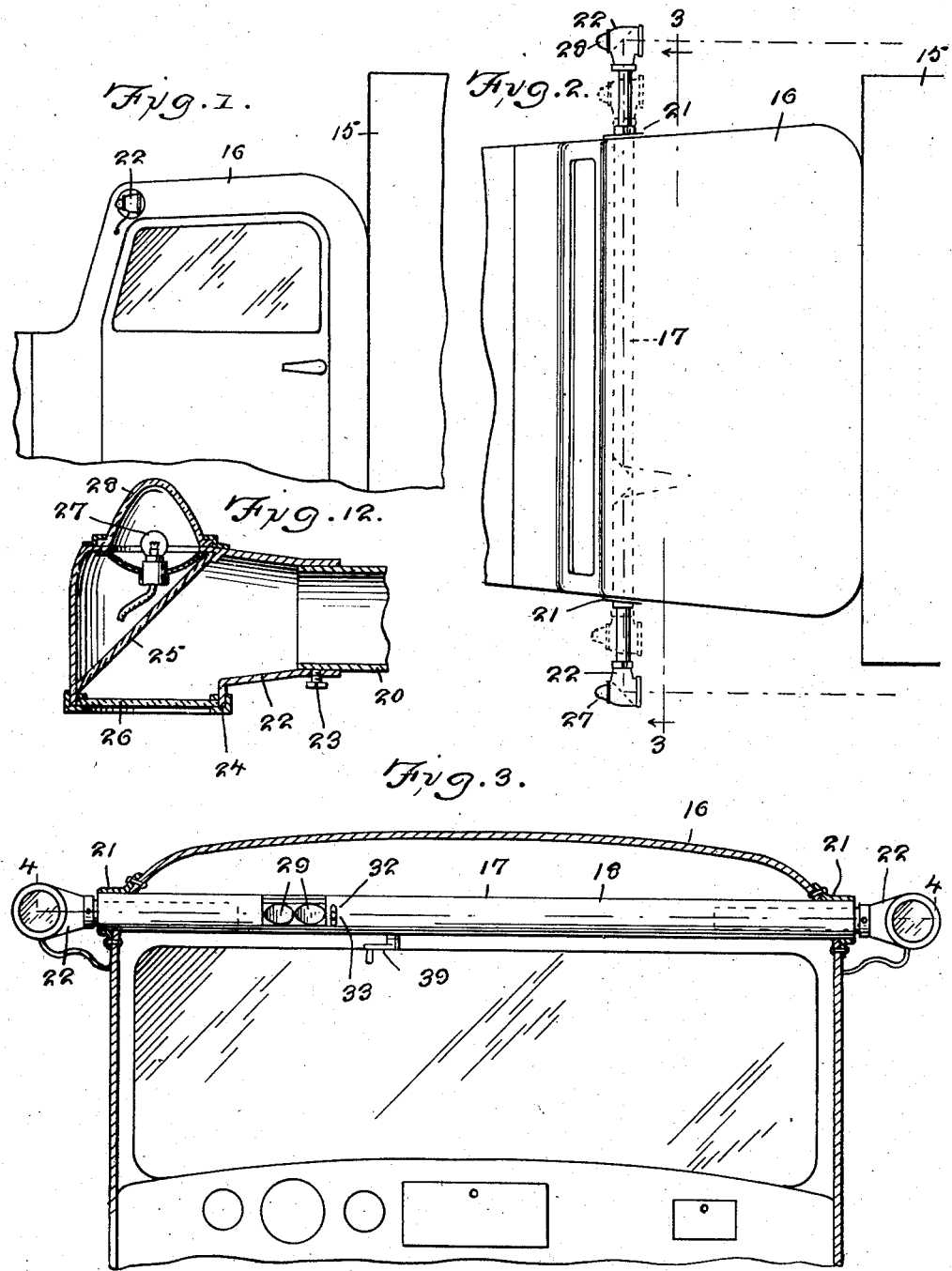

2,281,102

UNITED STATES PATENT OFFICE 2,281,102

REAR VISION DEVICE FOR VEHICLES

Willis L. Lowman, Newcastle, Ind.

Application June 24, 1940, Serial No. 342,148

2 Claims. (Cl. 88—70)

The present invention relates to rear vision devices for vehicles and more particularly for wide bodied commercial vehicles or trucks.

The present day commercial vehicles or trucks include a cab for the driver and a truck body, the truck body being considerably wider than the cab. Under the present traffic conditions, it is usually dangerous for the driver seated in the cab to attempt to pass another vehicle since clear vision is not readily attainable. The present rear view mirrors do not afford the driver with a clear vision of vehicles which may be travelling in the rear of the vehicle on the right or left side thereof and it is, therefore, the primary object of the present invention to provide a rear vision device whereby the driver of a commercial vehicle or truck may obtain a clear vision of whatever is at the rear of the vehicle on either side thereof.

Another object of the invention is to provide a rear vision device including a telescoping periscope conveniently arranged within the driver's cab having objective mirrors projecting beyond each side of the vehicle with means being provided for readily adjusting the length of the periscope and the mirrors disposed therein.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a partial side elevational view of a truck body with the device attached thereto.

Figure 2 is a partial top plan view thereof.

Figure 3 is a sectional view taken substantially on line 3—3 of Figure 2.

Figure 4 is a longitudinal sectional view through the telescoping periscope.

Figure 5 is a vertical sectional view taken substantially on line 5—5 of Figure 4.

Figure 6 is a sectional view taken substantially on line 6—6 of Figure 4.

Figure 7 is a sectional view taken substantially on line 7—7 of Figure 4.

Figure 8 is a sectional view taken substantially on line 8—8 of Figure 4.

Figure 9 is an elevational view partly in section of the telescoping tube as viewed from the top thereof.

Figure 10 is a perspective view of the mirror holding tube.

Figure 11 is a perspective view of one of the telescoping tubes.

Figure 12 is a detail sectional view of the projecting objective mirrors.

Referring to the drawings for a more detailed description thereof, there is disclosed a truck body 15 and driver's cab 16, the telescoping periscope generally designated by the reference numeral 17 preferably arranged through the cab and adjacent the front end thereof as more particularly shown in Figures 1 and 2 of the drawings. It will be observed that the truck body 15 is wider than the cab 16 so that the driver cannot look around toward the rear of the vehicle without difficulty and likewise the conventional rear mirror is inadequate on account of the lack of front and rear windows in the body of the cab.

The rear vision device 17 comprises a stationary tube 18, intermediate tube 19 and inner tube 20. While the tube 18 is stationarily mounted within the cab 16 the tubes 19 and 20 are held in telescoping relation and are adapted to be extended by a means to be hereinafter described for imparting clear vision to the driver of the vehicle of stationary or movable objects at the rear of the vehicle. Each end of the tube 18 has mounted therein the telescoping tubes 19 and 20, the construction of which is identical, and in the following description to avoid confusion, the construction of one end only will be described. It is to be understood, however, that the rear vision device in accordance with the present invention permits the operator of the vehicle to view objects on either side of the vehicle.

As afore indicated, the stationary tube 18 extends through the front end of the cab and each end is supported in bearings 21, said bearings being of the type to preclude rattling of the device as well as prevent the entrance of rain, snow or the like into the cab. A housing 22 is attached by means 23 to the projecting end of the inner tube 20, the face 24 of said housing extending at substantially right angles to the tube 20. A mirror 25 is diagonally held within the housing 22, said mirror acting to focus objects and to convey the image through the tube 20. A lens 26 covers the front face of the housing and, if desired, the rear wall thereof can be provided with a lamp 27 and reflector 28. The lamps 27 may take the place of signalling lights required of commercial vehicles.

Arranged within the stationary tube 18 so as to be visible to the driver of the vehicle is a system of mirrors 29, said mirrors being supported by any desired means within the tubular-shaped member 30. The mirrors 29 are held within the tube at an angle opposite to the mirror 25 so that an image focused on the mirror 25 will be projected through the inner tube 20 onto the mirror 29 so as to be readily visible to the operator of the vehicle.

The member 30 is frictionally held within the pair of spacing rings 31 and is adapted to be rotated the limit of the slot 32 by means of the handle 33 so as to adjust the mirrors 29 for proper vision of the driver. The handle 33 is threadedly attached within an opening 34 formed in one end of the member 30.

A feature of the present invention provides for the extension of the tubes 19 and 20 on each end of the device under the control of the operator of the vehicle, it being understood that the tube 20 telescopes within the tube 19 and that both tubes are telescopically supported within the stationary tube 18. As the tubes 19 and 20 are projected outwardly of the tube 18, the tube 20, which tube supports the reflecting mirror 25, will project beyond the tube 19. The inner end of each tube 19 has projecting therefrom a rack bar 35 formed with gear teeth 36, one rack bar overlapping the other as more particularly shown in Figure 4 of the drawings. A gear wheel 37 is in mesh with each rack bar, said gear wheel being mounted on a shaft 38 journalled in the wall of the outer tube 18 and adapted to be rotated by means of a crank handle 39. Rotation of the gear wheel in an anti-clockwise direction will urge the rack bars 35 and the tubes 19 beyond the outer end of the tube 18 and conversely rotation of the gear wheel 37 in a clockwise direction will urge the tubes 19 inwardly of the tube 18. As the tubes 19 are being moved by their rack bars 35, the inner tubes 20 are adapted to move therewith but at twice the speed of the tubes 19.

The means for sliding the inner tubes 20 upon moving the tubes 19 comprise auxiliary gear wheels and rack bars. As more particularly shown in Figure 9 of the drawings, the outer tube 18 is slotted as indicated at 40, one wall of the slot being formed with gear teeth 41 which act as a stationary rack bar. A gear wheel 42 is carried by each tube 19 and is in mesh with the teeth 41. A removable rack bar 43 is attached to and extends from the inner end of each of the inner tubes 20, the rack bars 43 being substantially U-shaped. By this construction, as the rack bars 35 and 36, for example, slide the intermediate tubes 19 outward of the tube 18, rotary motion is imparted to the gear wheels 42 which are in mesh with the teeth of the stationary and movable rack bars 41 and 43, respectively. Rotation of the gear wheels 42 imparts a movement to the rack bars 43 which is double that of the gear wheel 42, and since the rack bars 43 are an integral part of the inner tubes 20, the latter will move at twice the speed of the intermediate tubes 19. Thus while the tubes 19 and 20 are being moved outwardly of the tube 18, the inner tubes 20 will project beyond the intermediate tubes 19. As soon as the operator of the vehicle has moved the tubes the proper distance so as to obtain a clear vision of objects on either side of the truck body rotation of the crank handle 39 and gear wheel 37 will be stopped. It is, of course, to be understood that movement in either direction of the telescoping tubes will not affect the position of the mirrors 29 and member 30 so that there is provided in effect a horizontally disposed periscope by reason of the arrangement of the mirrors 25 and 29.

The slot 40 and gear teeth 41 are covered by means of a plate 44 which may be removably attached to the outer tube 18 by any desired means.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. A rear vision device for vehicles, comprising an elongated tube adapted to be stationarily mounted so as to extend through each side wall of the vehicle, an inner and outer tube slidably supported within each end of said elongated tube, means comprising rack bars extending from the inner ends of said outer tubes for telescoping said inner and outer tubes whereby said tubes will be projected beyond each end of said elongated tube with said inner tube extending beyond said outer tube, means journalled in the wall of said elongated tube in mesh with said rack bars for moving the same, a reflector mounted on the projecting ends of said inner tubes, and a mirror carried by said elongated tube and suitably positioned in the field of vision of the vehicle driver for receiving an image from the reflector to be viewed by the driver.

2. A rear vision device for vehicles, comprising an elongated tube adapted to be stationarily mounted so as to extend through each side wall of the vehicle, an inner and outer tube slidably supported within each end of said elongated tube, means for actuating said inner and outer tubes whereby said tubes will be projected beyond each end of said elongated tube with said inner tube extending beyond said outer tube, said means including said elongated tube having a slot formed in one face thereof, gear teeth formed in one wall of said slot, rack bars extending from the inner ends of said outer tubes, a gear in mesh with each of said rack bars, a movable rack bar extending from the inner ends of each of said inner tubes, a gear wheel carried by each of said outer tubes in mesh with the gear teeth of said elongated tube and the rack bars of said inner tubes, whereby rotation of said gear will actuate the rack bars of said outer tubes and the gear wheels and rack bars of said inner tubes to project said inner tubes beyond said outer tubes, a reflector mounted on the projecting ends of said inner tubes, and a mirror carried by said elongated tube and suitably positioned in the field of vision of the vehicle driver for receiving an image from the reflector to be viewed by the driver.

WILLIS L. LOWMAN.